United States Patent
Yu

(10) Patent No.: US 11,085,493 B2
(45) Date of Patent: Aug. 10, 2021

(54) SEAL CASE WITH OVER-MOLDED RUBBER GASKET SECURING PLASTIC WAFER

(71) Applicant: Consolidated Metco, Inc., Vancouver, WA (US)

(72) Inventor: Xin Yu, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 0 days.

(21) Appl. No.: 16/814,782

(22) Filed: Mar. 10, 2020

(65) Prior Publication Data
US 2020/0292000 A1    Sep. 17, 2020

Related U.S. Application Data

(60) Provisional application No. 62/817,471, filed on Mar. 12, 2019.

(51) Int. Cl.
| | | |
|---|---|---|
| *F16C 33/78* | (2006.01) | |
| *F16J 15/32* | (2016.01) | |
| *F16J 15/3252* | (2016.01) | |

(52) U.S. Cl.
CPC ...... *F16C 33/7876* (2013.01); *F16C 33/7823* (2013.01); *F16J 15/3252* (2013.01); *F16C 2326/02* (2013.01)

(58) Field of Classification Search
CPC .... F16C 33/78; F16C 33/7816; F16C 33/782; F16C 33/783; F16C 33/7833; F16C 33/7869; F16C 33/7876; F16C 33/7879; F16C 33/7883; F16C 33/7886; F16C 2326/02; F16J 15/3252; F16J 15/3256; F16J 15/32; B60B 27/0073
See application file for complete search history.

(56) References Cited

U.S. PATENT DOCUMENTS

| | | |
|---|---|---|
| 3,511,513 A | 5/1970 | Dahlheimer |
| 4,133,461 A | 1/1979 | Vercelot |
| 4,304,412 A * | 12/1981 | Ladin .................. F16C 33/7853 277/353 |
| 4,723,350 A | 2/1988 | Kobayashi et al. |
| 5,346,662 A | 9/1994 | Black et al. |
| 7,909,333 B2 * | 3/2011 | Greca .................. F16J 15/3264 277/349 |
| 9,228,681 B2 | 1/2016 | Kluss |
| 2003/0184021 A1 * | 10/2003 | Hatch .................. F16J 15/3228 277/395 |

(Continued)

OTHER PUBLICATIONS

PCT/US2020/021903 International Search Report and Written Opinion dated Jun. 16, 2020, 14 pages.

*Primary Examiner* — Alan B Waits
(74) *Attorney, Agent, or Firm* — Lathrop GPM LLP

(57) ABSTRACT

A seal case for a bearing seal includes (a) an inner case encircling a rotation axis of the bearing seal, (b) an outer case encircling the rotation axis and including a ring-shaped frame and a rubber gasket over-molded on the frame, and (c) a plastic wafer clamped between the inner case and the outer case, and secured at least by the rubber gasket. A method for manufacturing a bearing seal includes over-molding a rubber gasket onto a ring-shaped frame to form an outer case, placing a plastic wafer between the rubber gasket and an inner case, and securing the inner case to the outer case to form a seal case.

22 Claims, 8 Drawing Sheets

(56) References Cited

U.S. PATENT DOCUMENTS

| | | | |
|---|---|---|---|
| 2006/0145428 A1* | 7/2006 | Dudman | F16L 23/22 277/626 |
| 2008/0001365 A1* | 1/2008 | Lequire | F16J 15/3276 277/560 |
| 2010/0320698 A1* | 12/2010 | Shimomura | F16J 15/3228 277/572 |
| 2014/0239597 A1* | 8/2014 | White | B60B 27/0073 277/352 |

* cited by examiner

SEAL CASE WITH OVER-MOLDED RUBBER GASKET SECURING PLASTIC WAFER

CROSS-REFERENCE TO RELATED APPLICATIONS

This application claims priority to U.S. Provisional Application Ser. No. 62/817,471 filed Mar. 12, 2019, which is incorporated herein by reference in its entirety.

BACKGROUND

Wheel bearings generally require a bearing seal that seals between the bearing and the external environment, to prevent contaminants from entering the bearing and to prevent or reduce loss of oil from the bearing. A part of the bearing seal is affixed to the rotating part of the wheel assembly (the hub), and another part of the bearing seal is affixed to the stationary part of the wheel assembly (the axle). Many seals form a labyrinth between the rotating and stationary seal parts to create an arduous leakage path between bearing and the external environment while minimizing friction between rotating and stationary seal parts. Some seals are so called non-contact seals where the rotating part of the seal does not contact the stationary part of the seal. Contact seals are more common though. In a typical contact seal, one or more elastomers bridge between the rotating part of the seal and the non-rotating part of the seal to provide a physical barrier. During operation, bearing seals may be exposed to large amounts of dirt, water, as well as metal scraps from the wheel assembly, and the design and positioning of elastomer bridges are critical to the longevity of both the bearing seal and the bearing itself.

SUMMARY

In an embodiment, a seal case for a bearing seal includes (a) an inner case encircling a rotation axis of the bearing seal, (b) an outer case encircling the rotation axis and including a ring-shaped frame and a rubber gasket over-molded on the frame, and (c) a plastic wafer clamped between the inner case and the outer case, and secured at least by the rubber gasket.

In an embodiment, a bearing seal includes the above-mentioned seal case, wherein the outer case has an inner side facing the inner case and an outer side opposite the inner side, and wherein the plastic wafer includes (a) a radial leg clamped between the inner case and the outer case and (b) a lip connected to an innermost diameter of the radial leg. The bearing seal further includes a sleeve encircling the rotation axis and wrapping around (i) at least a portion of the outer side of the seal case and (ii) a radially-innermost extreme of the seal case, wherein the sleeve is rotatable about the rotation axis relative to the seal case, the sleeve includes an inner-diameter leg that is radially inwards from the seal case and extends in a direction parallel to the rotation axis, and the inner-diameter leg engages with the lip.

In an embodiment, a method for manufacturing a bearing seal includes over-molding a rubber gasket onto a ring-shaped frame to form an outer case, placing a plastic wafer between the rubber gasket and an inner case, and securing the inner case to the outer case to form a seal case.

DETAILED DESCRIPTION OF THE EMBODIMENTS

Figure 1A:
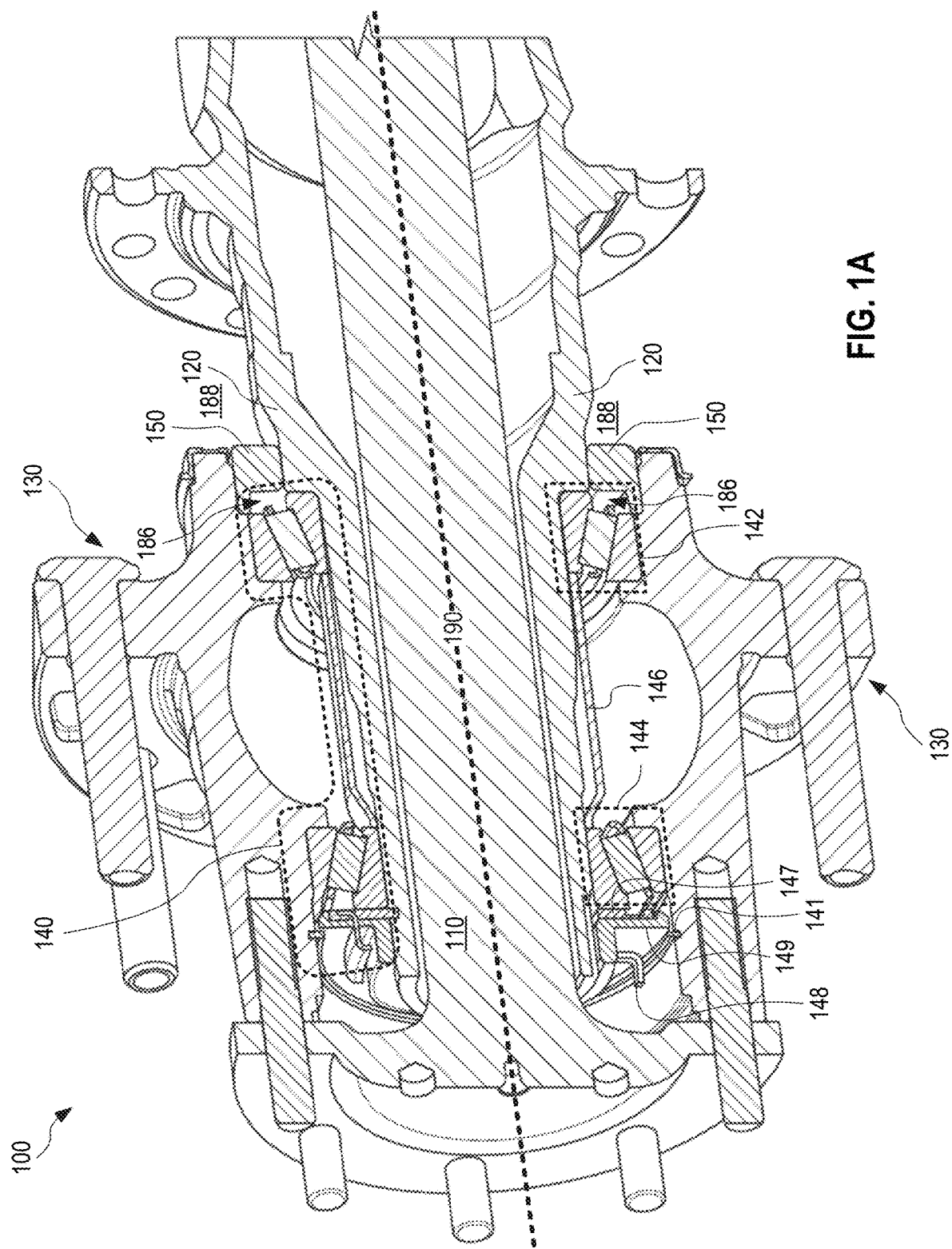
FIGS. 1A and 1B illustrate a drive wheel end of a vehicle, according to an embodiment.
Figure 1B:
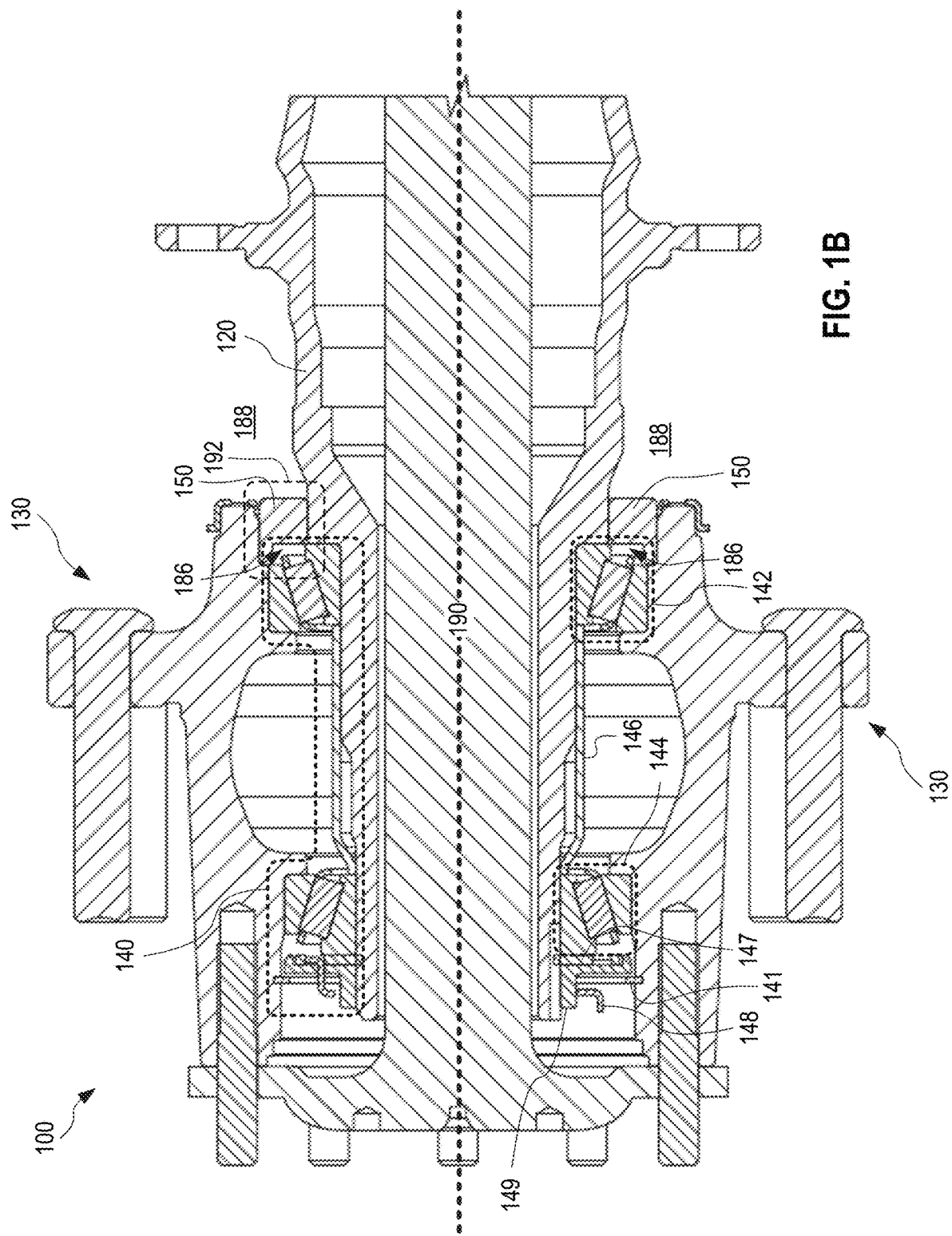

FIGS. 1A and 1B illustrate one drive wheel end 100 of a vehicle, such as a tractor. FIG. 1A is an isometric full-section view showing one half of drive wheel end 100. The section used in FIG. 1A contains the rotation axis 190 of drive wheel end 100. FIG. 1B is a cross-sectional view of drive wheel end 100, with the cross section containing rotation axis 190. FIGS. 1A and 1B are best viewed together in the following description. Drive wheel end 100 includes an axle shaft 110, and axle 120, a hub assembly 130, a bearing system 140, and a bearing seal 150. Hub assembly 130 is rigidly attached to axle shaft 110 and is configured to accommodate a wheel (not shown in FIGS. 1A and 1B) of the vehicle. Axle 120 supports at least part of the load of the vehicle. To engage drive wheel end 100, an engine rotates axle shaft 110 via a drive line, which causes hub assembly 130 to rotate about axle 120.

Bearing system 140 reduces friction between hub assembly 130 and axle 120. For this purpose, bearing system 140 includes an inboard bearing 142 and an outboard bearing 144. Bearing system 140 may, but need not, further include (a) a spacer 146 limiting endplay of inboard bearing 142 and outboard bearing 144, (b) a lock ring 148, a lock washer 147, and a spindle nut 149 secured to axle 120, and (c) a snap ring 141 secured to hub assembly 130. Spacer 146, lock ring 148, lock washer 147, spindle nut 149, and snap ring 141 cooperate to keep inboard bearing 142 and outboard bearing 144 properly positioned and secured. Bearing system 140 requires lubrication, such as oil or grease, at inboard bearing 142, outboard bearing 144, and bearing seal 140 to achieve low-friction rotation of hub assembly 130 about axle 120. During operation, lubrication is provided along axle 120 and from hub assembly 130.

Bearing seal 150 seals an "oil side" 186, associated with bearing system 140 and its lubrication, from an "air side" 188 that is external to drive wheel end 100. Bearing seal 150 serves to prevent or at least reduce (a) loss of lubrication from oil side 186 to air side 188 and (b) penetration of contaminants (e.g., external fluids, particles, and/or dirt) from air side 188 to oil side 186 and into bearing system 140. Penetration of such contaminants into bearing system 140 may be detrimental to lubricant, increase friction, and cause damage in bearing system 140.

Figure 2:
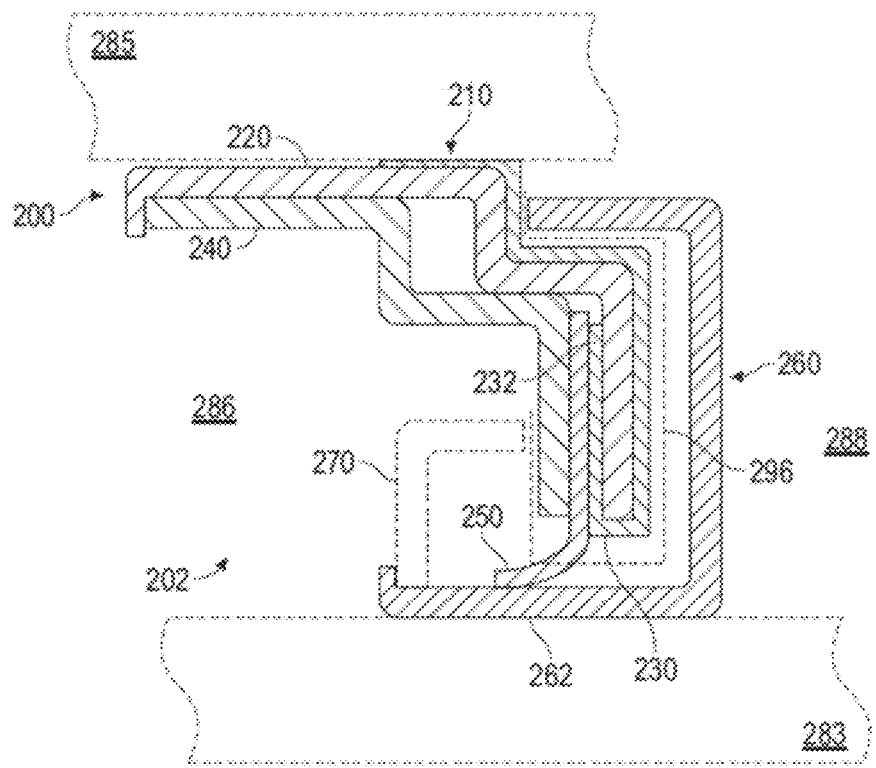
FIG. 2 illustrates a bearing seal having a seal case with an over-molded rubber gasket securing a plastic wafer, according to an embodiment.
Figure 3:
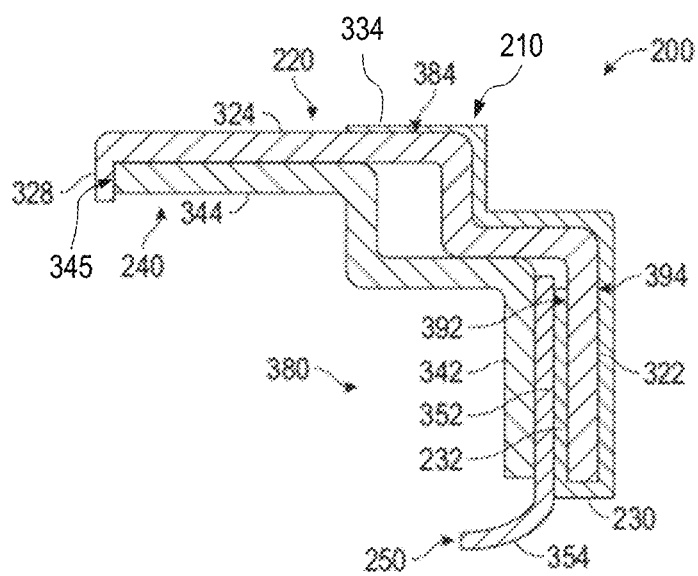
FIG. 3 shows the seal case of FIG. 2 in further detail.

FIG. 2 illustrates one bearing seal 202 with a seal case 200 and an over-molded rubber gasket 230 that secures a plastic wafer 250. FIG. 2 depicts a cross section of bearing seal 202 similar to the view of bearing seal 150 in region 192 of FIG. 1B. FIG. 3 shows seal case 200 in further detail. FIGS. 2 and 3 are best viewed together in the following description. As will be discussed in further detail below in reference to FIGS. 6 and 7, over-molded rubber gasket 230 facilitates simple assembly of seal case 200.

Bearing seal 202 is an example of bearing seal 150 but may also be used in other types of wheel assemblies and/or to seal other types of bearings. For example, bearing seal 202 may be implemented in a trailer wheel end or a steering wheel end, both of which have a solid axle without an axle shaft which instead is replaced by a hub cap. Bearing seal 202 includes seal case 200, plastic wafer 250, and sleeve 260. Each of seal case 200, rubber gasket 230, plastic wafer 250, and sleeve 260 encircles the rotation axis of seal case 200 and bearing seal 202 (e.g., rotation axis 190, FIGS. 1A and 1B). Arrow 380 in FIG. 3 indicates a direction that is parallel to the rotation axis of seal case 200 and bearing seal 202. Plastic wafer 250 rigidly attaches to inner case 240 and outer case 210. Sleeve 260 is rotatable, relative to seal case 200 and plastic wafer 250, about the rotation axis of bearing seal 202 (seal case 200 and plastic wafer 250 may rotate relative to a stationary sleeve 260, or sleeve 260 may rotate relative to a stationary seal case 200 and plastic wafer 250). In actual use, seal case 200 may be affixed to a hub 285 (e.g., hub assembly 130), and sleeve 260 may be affixed to an axle 283 (e.g., axle 120). In an alternative embodiment, not depicted in FIG. 2, seal case 200 is affixed to axle 283 and sleeve 260 is affixed to an hub 285. In either case, seal case 200 and sleeve 260 cooperate to form a labyrinth path 296 between an oil side 286 of bearing seal 202 and an air side 288 of bearing seal 202. Plastic wafer 250 bridges across labyrinth path 296 to an inner-diameter leg 262 of sleeve 260 to form a physical barrier in labyrinth path 296. Plastic wafer 250 is interference-fitted with inner-diameter leg 262 but may be separated from actual contact with inner-diameter leg 262 by a thin layer of lubricant.

Seal case 200 includes an inner case 240 and an outer case 210. Outer case 210 includes a frame 220 and a rubber gasket 230 over-molded onto frame 220. Plastic wafer 250 is secured to seal case 200 by clamping between rubber gasket 230 and inner case 240. Inner case 240 includes a radial leg 342 and an axial leg 344. Frame 220 includes a radial leg 322 and an axial leg 324. In the embodiments depicted in FIGS. 2 and 3, radial legs 342 and 322 are substantially orthogonal to the rotation axis of seal case 200 and bearing seal 202. Without departing from the scope hereof, radial legs 342 and 322 may be at an oblique angle to direction 380. Herein, a "radial leg" generally refers to a leg that is more orthogonal than parallel to the rotation axis. Axial legs 344 and 324 are substantially parallel to direction 380. Inner case 240 and frame 220 are affixed to each other. For example, as shown in FIG. 3, axial leg 344 of inner case 240 presses against axial leg 324 of frame 220, and a portion 328 of frame 220 is crimped over the edge 345 of axial leg 344 of inner case 240.

Herein, "rubber" refers to a viscoelastic polymer and may be natural or synthetic. Rubber gasket 230 is formed from a material that is moldable, for example by injection or compression molding. Herein, "plastic" refers to a polymer. In certain embodiments, plastic wafer 250 is formed from a polymer that is not injection-moldable or difficult to injection mold, such as a polymer that does not flow when melted. In one such embodiment, plastic wafer 250 is made of or includes polytetrafluoroethylene (PTFE). Plastic wafer 250 may be formed from a mixture of PTFE and additives such as glass fiber, carbon fiber, graphite, and/or molybdenum disulfide ($MoS_2$), with PTFE being the dominant component. Each of frame 220 and inner case 240 may be made of metal. Metal embodiments of frame 220 and inner case 240 are formed by stamping or spin forming, for example.

In inner case 240, radial leg 342 and axial leg 344 may be in direct connection with each other; or, as depicted in FIGS. 2 and 3, inner case 240 may have one or more kinks between radial leg 342 and 344 (FIGS. 2 and 3 depict one such kink). Similarly, in frame 220, radial leg 322 and axial leg 324 may be in direct connection with each other; or frame 220 may have one or more kinks between radial leg 322 and 324 (FIGS. 2 and 3 depict one such kink).

Rubber gasket 230 is over-molded at least onto an inner side 392 of radial leg 322 to form a portion 232 that helps secure plastic wafer 250. More specifically, a radial leg 352 of plastic wafer 250 is secured between portion 232 of rubber gasket 230 and radial leg 342 of inner case 240, while a lip 354 connected to the innermost portion of radial leg 352 extends radially inwards from radial legs 352, 322, and 342 to engage with inner-diameter leg 262 of sleeve 260. In certain embodiments, rubber gasket 320 is, in addition, over-molded onto an outer side 394 of frame 220 and, optionally, includes an outer portion 334 extending along at least a portion of a radially outward-facing surface 384 of axial leg 324. Outer portion 334 may help secure seal case 200 to hub 285 and form a static seal between seal case 200 and hub 285.

Bearing seal 202 may further include a retainer ring 270 secured to sleeve 260, such that plastic wafer 250 and a portion of seal case 200 are between retainer ring 270 and sleeve 260. Sleeve 260 may be a metal sleeve formed by spin forming or stamping, optionally further including an over-molded rubber gasket as discussed below in reference to FIG. 4. Retainer ring 270 may be made of metal or plastic, for example made by spin forming or stamping.

It is understood that seal case 200 may be provided as a standalone seal case configured for implementation with third-party bearing seal components, including their versions of sleeve 260 and retainer ring 270.

Figure 4:
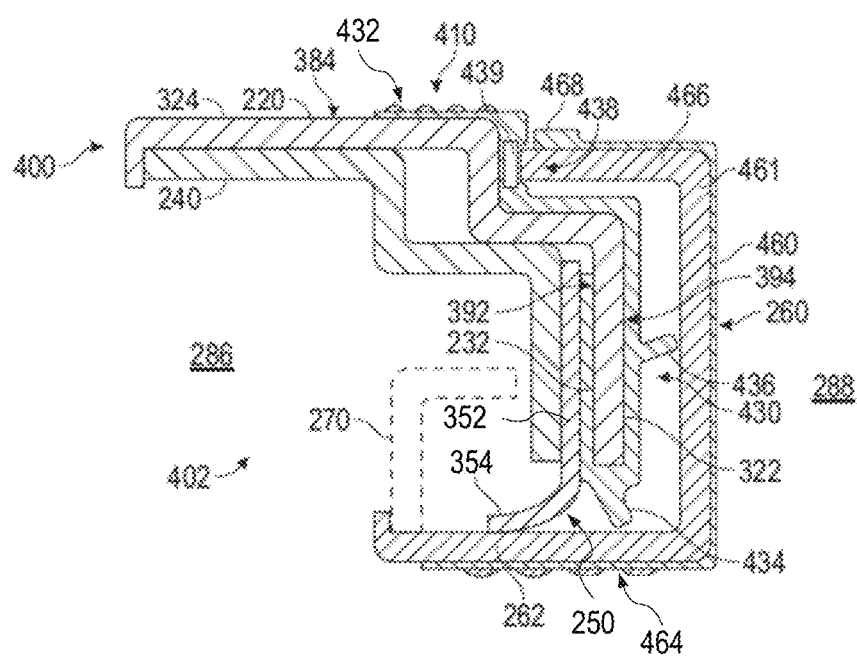
FIG. 4 illustrates a seal case having a multi-purpose over-molded rubber, according to an embodiment.

FIG. 4 illustrates one seal case 400 having a multi-purpose over-molded rubber gasket 430. Seal case 400 and rubber gasket 430 are embodiments of seal case 200 and rubber gasket 230, respectively, in FIGS. 2 and 3. FIG. 4 shows seal case 400 as being implemented in one bearing seal 402, an embodiment of bearing seal 202, together with sleeve 260 and, optionally, retainer ring 270 of FIGS. 2 and 3.

Seal case 400 includes outer case 410 and inner case 240. Outer case 410 includes frame 220 and rubber gasket 430. Rubber gasket 430 is over-molded onto both inner side 392 and outer side 394. On inner side 392, rubber gasket 430 forms portion 232 that captures plastic wafer 250, as discussed above in reference to FIGS. 2 and 3. In addition, rubber gasket 430 includes one or more of the following features: a radial lip 434 at the radially innermost edge of radial leg 322 (or multiple such radial lips), an axial lip 436 on outer side 394 of radial leg 322 (or multiple such axial lips), a receptacle 438, and a radially outward-facing ribbed section 432, including one or more ribs, on radially outward-facing surface 384 of axial leg 324 of frame 220. Each of these additional features may be formed when molding rubber gasket 430, thereby eliminating more complex assembly required to implement similar features as separate components.

Radial lip 434 forms another physical barrier crossing labyrinth path 296 (not labeled in FIG. 4, for clarity of illustration). Radial lip 434 helps keep out contaminants from air side 288 and thereby protect lip 354 as well as the bearing sealed by bearing seal 402. Radial lip 434 may further cooperate with lip 354 of plastic wafer 250 to form a pre-lube grease pocket that keeps bearing seal 402 lubricated. Axial lip 436 also helps keep out contaminants from air side 288. Receptacle 438 is configured to accommodate a thrust bumper 439. Thrust bumper 439 serves as a bumper for sleeve 260. During axial movement of sleeve 260 relative to seal case 400, the end of an outer axial leg 466 of sleeve 260 may bump against thrust bumper 439, which helps limit axial movement between sleeve 260 and seal case 400 and/or prevent damage to either one of seal case 400 and sleeve 260 during such axial movement. Alternatively, thrust bumper 439 is an integrally molded feature of rubber gasket 430. Without departing from the scope hereof, outer axial leg 466 may be omitted entirely from sleeve 260, in which case receptacle 438 and thrust bumper 439 are omitted as well. Ribbed section 432 are configured to help secure seal case 400 in hub 285 and form a static seal between seal case 400 and hub 285.

As shown in FIG. 4, sleeve 260 may include a frame 461 and a rubber gasket 460 over-molded onto air side 288 of frame 461 facing away from seal case 400. Without departing from the scope hereof, sleeve 260 of bearing seal 202 may implement frame 461 and rubber gasket 460. Rubber gasket 460 may include a section 464 disposed on inner-diameter leg 262 to help secure sleeve 260 on axle 283 and to form a static seal between sleeve 260 and axle 283. Section 464 may be ribbed. On axial leg 466, rubber gasket 460 may include a flange 468 that cooperates with rubber gasket 430 (or 230) to extend labyrinth path 296.

Figure 5:
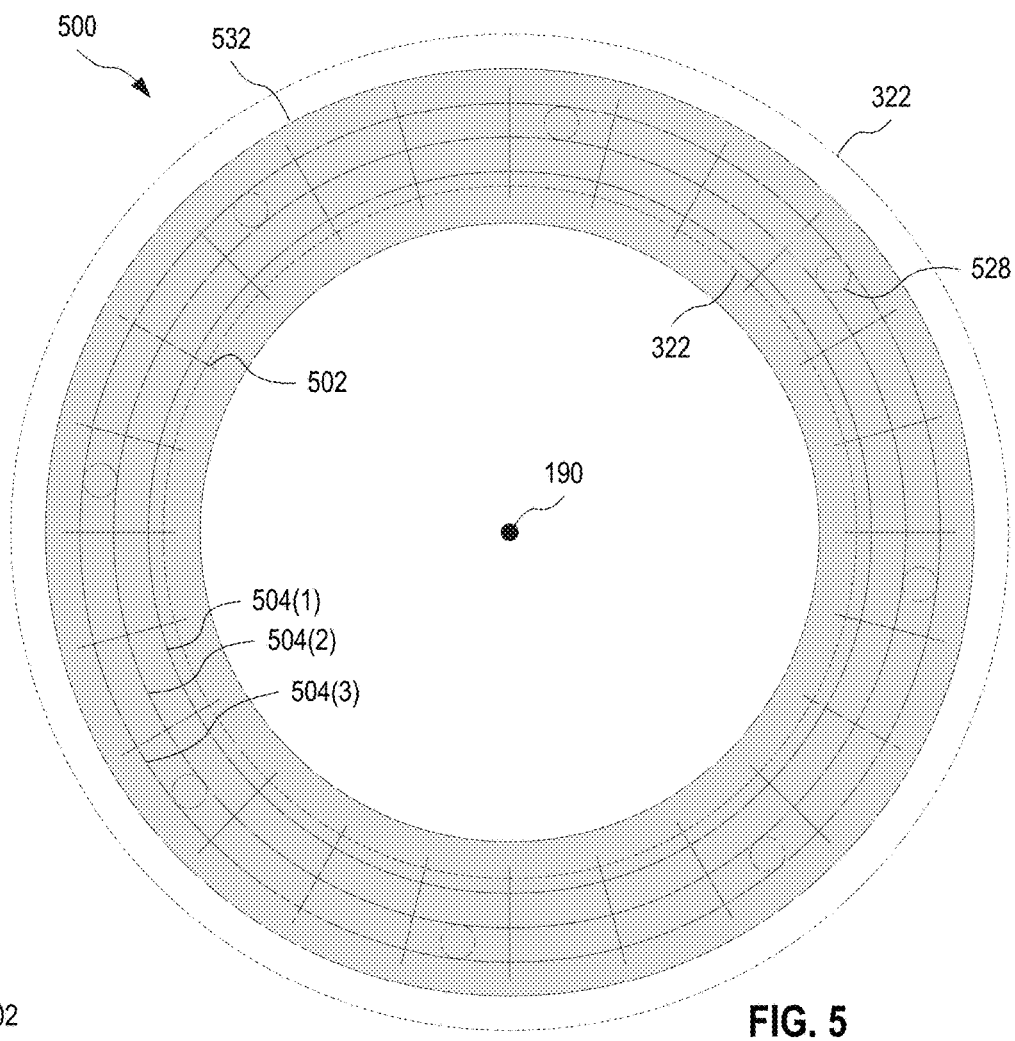
FIG. 5 illustrates a rubber gasket with ribs, according to an embodiment.

FIG. 5 illustrates one rubber gasket 500 with ribs. Rubber gasket 500 is an embodiment of rubber gasket 230 of FIGS. 2 and 3. FIG. 5 shows a portion 532 of rubber gasket 500 over-molded onto radial leg 322 of frame 220, as viewed along direction 380 of FIG. 3. Rubber gasket 500 includes a plurality of radial ribs 502 that are substantially orthogonal to rotation axis 190. Radial ribs 502 may resist slippage between rubber gasket 500 and plastic wafer 250, when rubber gasket 500 is implemented in seal case 200. The number of radial ribs 502 may be different from that depicted in FIG. 5. Rubber gasket 500 may further include one or more circumferential ribs 504. Circumferential ribs 504 may contribute to the formation of a static seal between plastic wafer 250 and rubber gasket 500, when rubber gasket 500 is implemented in seal case 200. FIG. 5 depicts three circumferential ribs 504(1), 504(2), and 504(3). However, other embodiments of rubber gasket 500 may have one, two, or more than three circumferential ribs 504.

Without departing from the scope hereof, rubber gasket 500 may include circumferential ribs 504 but omit radial ribs 502.

In one embodiment, radial leg 322 forms a plurality of holes 528, for example at least four holes 528. Holes 528 help promote flow of the material of rubber gasket 500 (or another embodiment of rubber gasket 230) during molding thereof.

Figure 6:
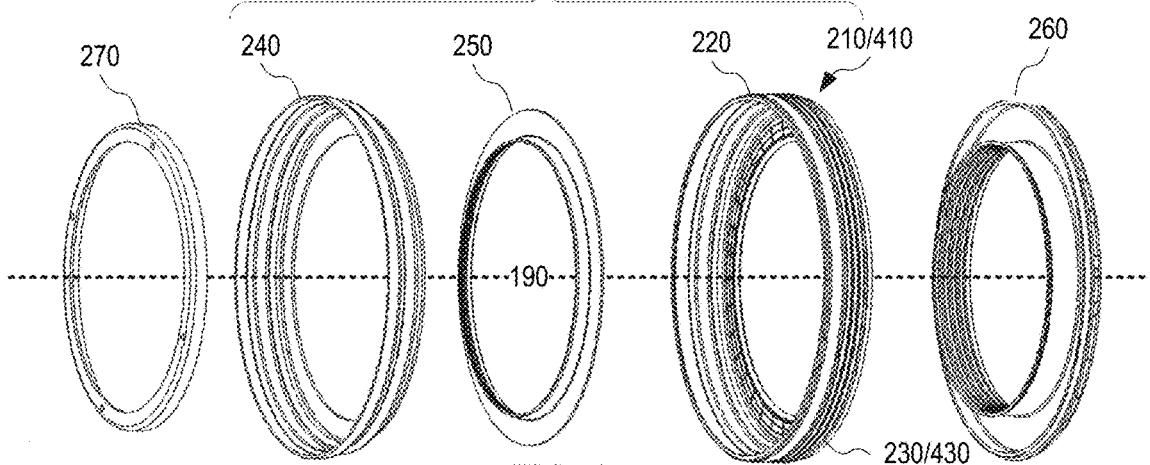
FIG. 6 is an exploded view of a bearing seal, according to an embodiment.

FIG. 6 is an exploded view of bearing seal 202. The particular embodiment depicted in FIG. 6 is seal case 400 in bearing seal 402. As compared to a seal case with a separate rubber gasket (instead of an over-molded rubber gasket), over-molded rubber gasket 230 facilitates ease of assembly of seal case 200, since no separate rubber gasket needs to be aligned to and assembled with other components of seal case 200. After rubber gasket 230 has been over-molded onto frame 220, only three parts need to be assembled to form seal case 200. Seal case 400 is associated with additional benefits since each radial lip 434, axial lip 436, receptacle 438, and ribbed section 432 may be formed together with the rest of rubber gasket 430 in a single molding operation.

Figure 7:
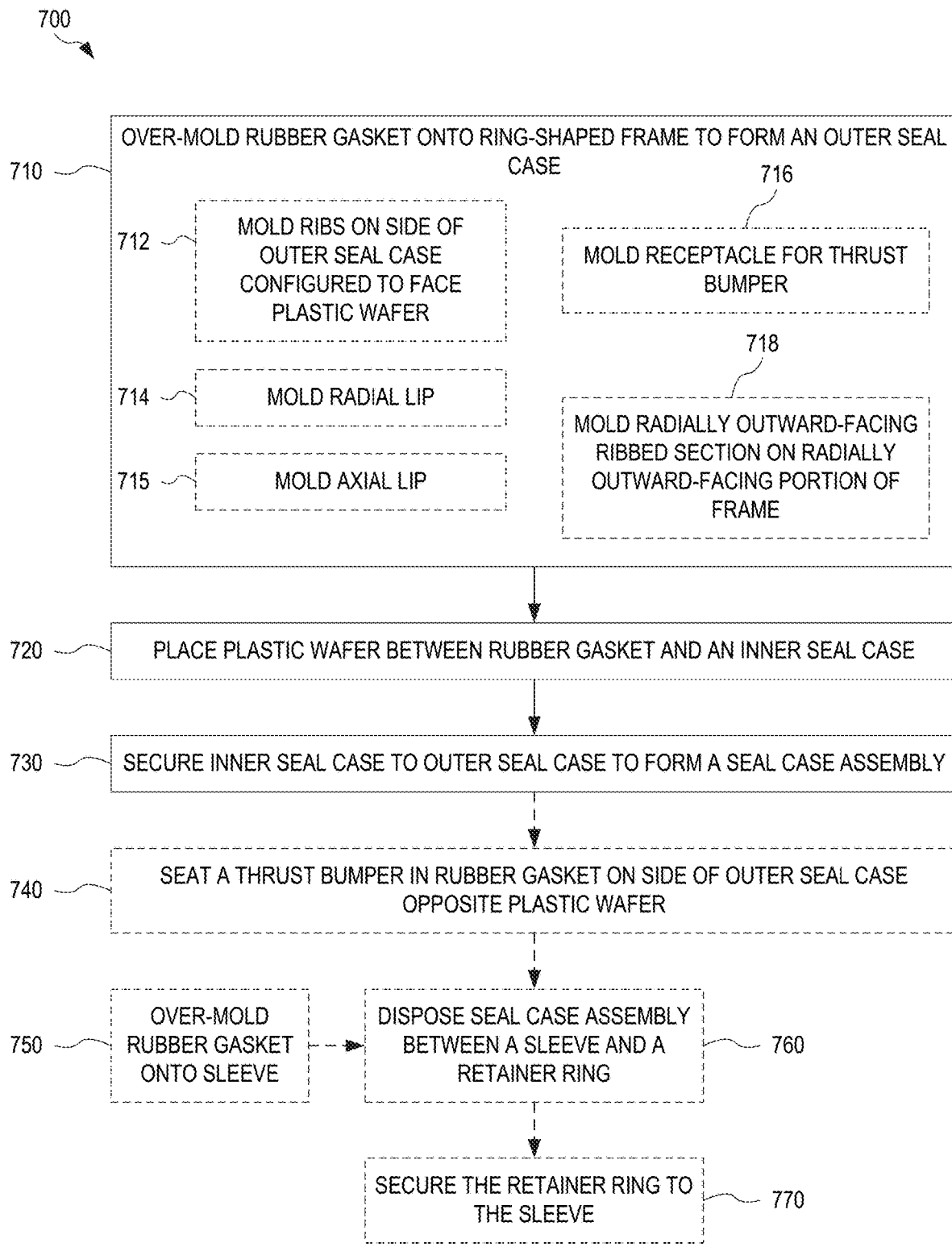
FIG. 7 illustrates a method for manufacturing a seal case and, optionally, a bearing seal, according to an embodiment.

FIG. 7 illustrates one method 700 for manufacturing a seal case and, optionally, a bearing seal. Method 700 may be used to manufacture seal case 200, seal case 400, bearing seal 202, and bearing seal 402. Method 700 includes steps 710, 720, and 730.

Step 710 over-molds a rubber gasket onto a ring-shaped frame to form an outer case. Step 710 may use injection or compression molding to over-mold the rubber gasket onto the frame. In one example of step 710, rubber gasket 230 is over-molded onto frame 220 to form outer case 210. Over-molding in step 710 may include preparing the frame for over-molding by treating the frame with phosphate (or another adhesion promoting agent) and applying an adhesive to the phosphate-treated frame. Step 710 may further include trimming flashes from the over-molded rubber gasket at locations of the over-molded rubber gasket corresponding to mold seams.

Step 710 may include one or more of steps 712, 714, 715, 716, and 718 to form corresponding features in the over-molded rubber gasket. Regardless of which ones, if any, of steps 712, 714, 715, 716, and 718 are included in step 710, the rubber gasket is integrally formed and may be formed in a single molding operation (as opposed to forming different portions of the rubber gasket in different successive molding operations using different respective molds).

Step 712 molds ribs on a side of the outer case configured to face a plastic wafer. In one example of step 712, step 710 forms radial ribs 502 and/or circumferential ribs 504. Step 714 molds a radial lip, such as radial lip 434. Step 715 molds an axial lip, such as axial lip 436. Step 716 molds a receptacle for a thrust bumper, such as receptacle 438. Step 718 molds a radially outward-facing ribbed section on a radially outward-facing portion of the frame, e.g., to form ribbed section 432.

Step 720 places a plastic wafer between the rubber gasket, over-molded onto the frame in step 710, and an inner case. In one example of step 720, plastic wafer 250 is seated in outer case 210, whereinafter inner case 240 is seated in outer case 210 on top of plastic wafer 250 (see FIG. 6, for example).

Step 730 secures the inner case to the outer case to form a seal case. In one example of step 730, portion 328 of frame 220 is crimped over the edge of axial leg 344 of inner case 240 (see FIG. 3, for example) to form seal case 200.

Embodiments of method 700 that include step 716 may further include a step 740 of seating a thrust bumper in the receptacle of the rubber gasket on the side of the outer case that is opposite the plastic wafer. In one example of step 740, thrust bumper 439 is seated in receptacle 438.

Method 700 may further include a step 760, optionally preceded by a step 750 and optionally followed by a step 770. Step 760 disposes the seal case between a sleeve and a retainer ring. In one example of step 760, seal case 200 is disposed between sleeve 260 and retainer ring 270 (see FIG. 6, for example). Step 770 secures the retainer ring to the sleeve. In one example of step 770, a distal edge of inner-diameter leg 262 of sleeve 260 is crimped around a radially-outermost edge of retainer ring 270 (see FIG. 2, for example). Step 750 over-molds a rubber gasket onto the sleeve. Step 750 may be performed in a manner similar to that of step 710 to form rubber gasket 460 (see FIG. 4, for example).

Although not shown in FIG. 7, method 700 may further include forming the ring-shaped frame used in step 710. Method 700 may use stamping or spin forming to form the frame. Similarly, method 700 may further include forming one or both of the sleeve and the retainer ring, for example using stamping or spin forming.

Figure 8A:
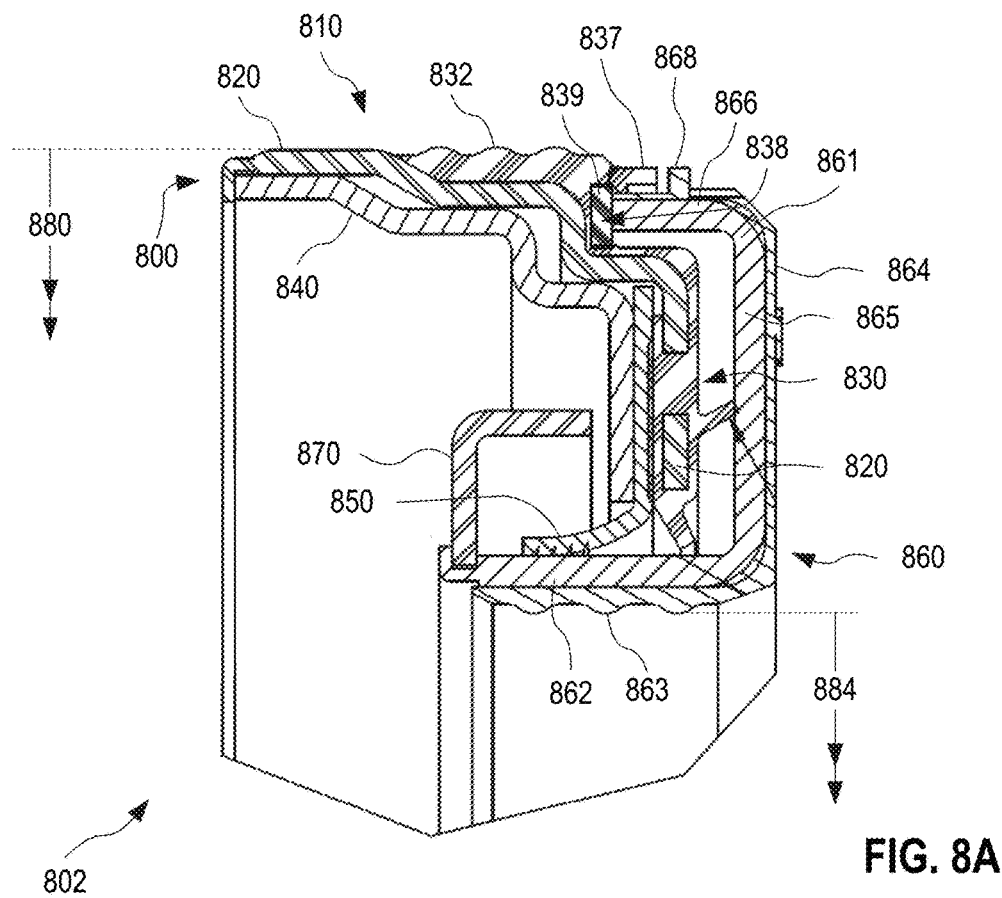
FIGS. 8A, 8B, and 8C together illustrate a seal case and a bearing seal, according to an embodiment.
Figure 8B:
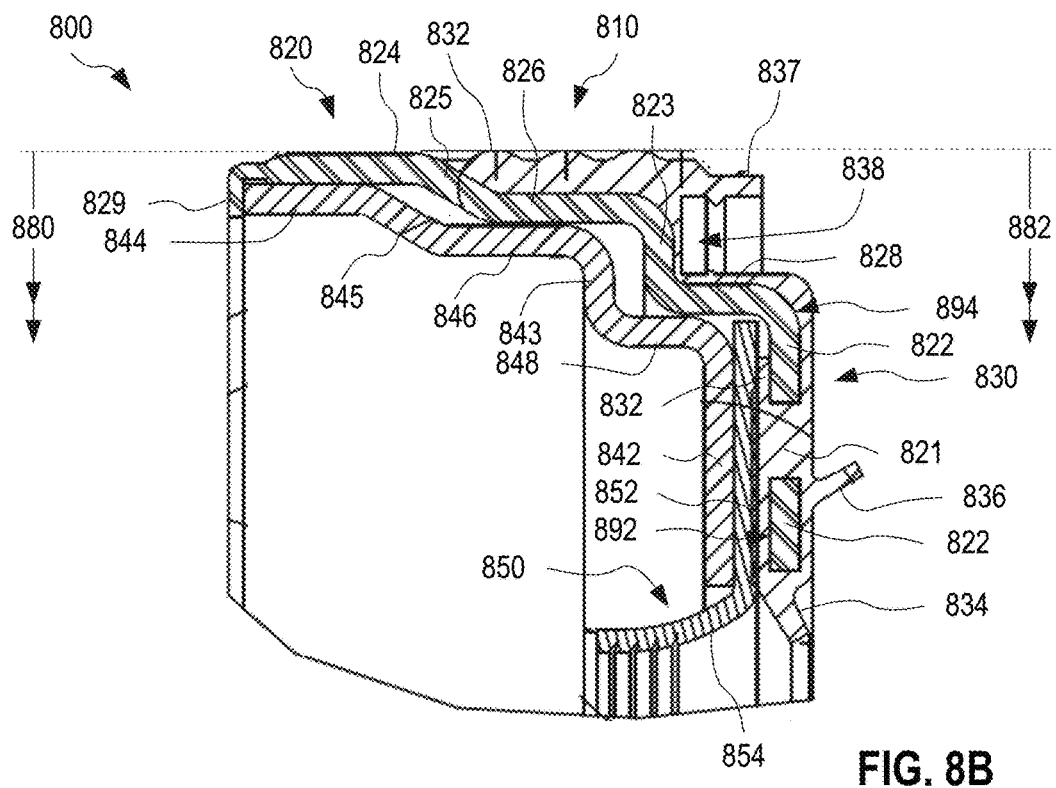
Figure 8C:
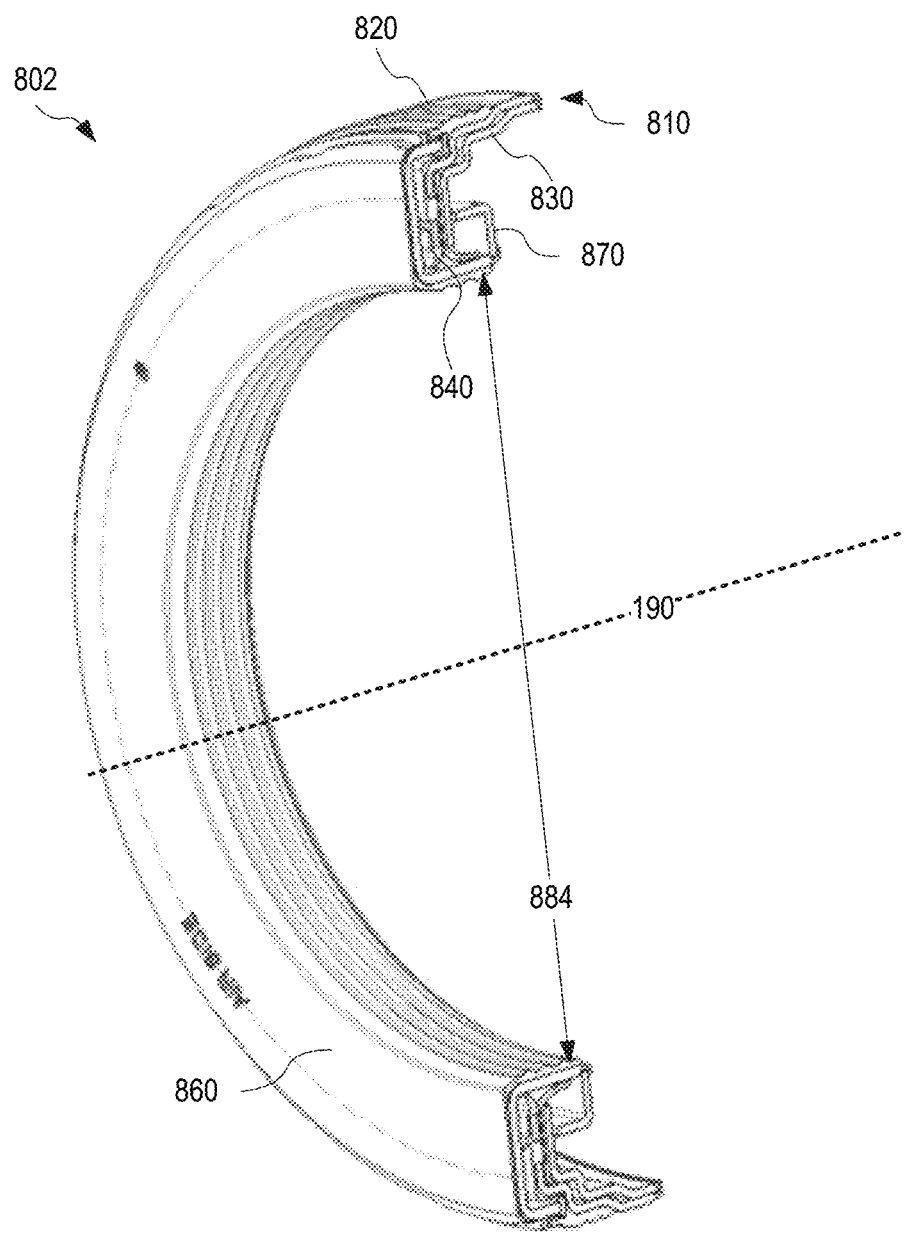

FIGS. 8A-C together illustrate one seal case 800 and one bearing seal 802. Seal case 800 and a bearing seal 802 are embodiments of seal case 400 and a bearing seal 402, respectively. FIG. 8A is a cross section of bearing seal 802, with the cross section taken in a plane that includes the rotation axis of bearing seal 802. FIG. 8B is a cross section of seal case 800 alone, taken in the same plane as FIG. 8A. FIG. 8C is a isometric full-section view showing one half of bearing seal 802. FIGS. 8A-C are best viewed together in the following description.

Bearing seal 802 includes seal case 800, a sleeve 860, a retainer ring 870, and a thrust bumper 839. Seal case 800 includes an outer case 810, an inner case 840, and a plastic wafer 850 captured between outer case 810 and inner case 840. Outer case 810 includes a frame 820 and a rubber gasket 830 over-molded onto frame 820. Rubber gasket 830 helps capture plastic wafer 850 and serves several other functions in addition.

Inner case 840 includes several legs serially connected to each other in the following order: a radial leg 842, an axial leg 848, a radial leg 843, an axial leg 846, a conical leg 845, and an axial leg 844. Similarly, frame 820 includes several legs serially connected to each other in the following order: a radial leg 822, an axial leg 828, a radial leg 823, an axial leg 826, a conical leg 825, and an axial leg 824. One or more of axial legs 848, 846, and 844 of inner case 840 may be pressure fit against corresponding axial legs 828, 826, and 824 of frame 820 to partly secure inner case 840 in frame 820 and define the radial position of inner case 840 relative to frame 820. Alternatively, very small clearances are designed between axial legs 848, 846, and 844 of inner case 840 and the respective axial legs 828, 826, and 824 of frame 820. Optionally, one or more of these clearances become interference fits in the presence of manufacturing tolerances. Frame 820 further includes, at the distal edge of portion of axial leg 824, a portion 829 crimped over the distal edge of axial leg 844 of inner case 840 to at least axially secure inner case 840 to frame 820.

Sleeve 860 includes a frame 861 and a rubber gasket 864 over-molded onto the side of frame 861 facing away from seal case 800. Frame 861 includes an inner-diameter leg 862, a radial leg 865, and an outer axial leg 866. Rubber gasket 864 forms a ribbed section on the radially inwards-facing surface of inner-diameter leg 862 and extends from the ribbed section along radial leg 865 to a flange 868 on the radially outward-facing surface of outer axial leg 866. Although not shown in FIGS. 8A-C, rubber gasket 861 may extend to the side of frame 861 facing seal case 800 and, for example, include labyrinth features in the gap between frame 861 and seal case 800.

Rubber gasket 830 includes, on the side 892 of radial leg 822 facing inner case 840, a ribbed section 832 that helps capture a radial leg 852 of plastic wafer 850 between inner case 840 and outer case 810. A lip 854 of plastic wafer 850, connected to the innermost portion of radial leg 852, extends radially inwards from radial legs 852, 822, and 842 to engage with inner-diameter leg 862 of sleeve 860. Rubber gasket 830 extends from ribbed section 832 around the radially innermost edge of radial leg 822, and continues along the side 894 of frame 820 facing away from inner case 840 to a ribbed section on the radially outward-facing surface of axial leg 826 and conical leg 825 of frame 820. Frame 820 forms a plurality of holes 821 (examples of holes 528), and rubber gasket 830 extends through holes 821. At the radially innermost edge of frame 820, rubber gasket 830 forms a radial lip 834 (an example of radial lip 434). Rubber gasket 830 further forms an axial lip 836 (an example of axial lip 436), a receptacle 838 (an example of receptacle 438), a ribbed section 832 (an example of ribbed section 432), and a lip 837 extending axially toward flange 868. Although not shown in FIGS. 8A-C, rubber gasket 830 may form multiple axial lips 836 to reinforce the contamination excluding performance.

The outer diameter 882 of seal case 800 is defined by ribbed section 832 of rubber gasket 830. Outer diameter 880 of frame 820 is slightly less than outer diameter 882 to allow ribbed section 832 of rubber gasket 830 to engage with a hub (e.g., hub 285). In one embodiment, (a) outer diameter 882 is in the range between 100 and 200 millimeters, for example between 140 and 160 millimeters, (b) outer diameter 880 is between 0.5 and 1.0 millimeters less than outer diameter 882, and (c) the inner diameter 884 of sleeve 860, defined by ribbed section 864, is between 60 and 80 percent of outer diameter 882. In an alternative embodiment, ribbed section 832 is omitted, and the outer diameter of seal case 800 is outer diameter 880 of frame 820.

Each of inner case 840, frame 820, frame 861, and retainer ring 870 may be made of metal, such as iron, aluminum, steel, or another metal alloy. Retainer ring 870 may, alternatively, be made of a hard plastic. Plastic wafer 850 may include PTFE, for example in a mixture containing glass fiber and $MoS_2$.

In a life performance test of bearing seal 802, two different compositions of plastic wafer 850 were compared to each other: (1) PTFE with 5% glass fiber and 5% $MoS_2$ and (2) PTFE with 15% glass fiber and 5% $MoS_2$. In this test, bearing seal 802 implementing plastic wafer 850 of composition (1) had an average life of 11,089 hours, with the measured life durations ranging between 8,772 and 11,406 hours (test suspended without failure). Bearing seal 802 implementing plastic wafer 850 of composition (2) had an average life of 6286 hours, with the measured life durations ranging between 5955 and 6617 hours. In this test, composition (1) proved superior, although both composition (1) and composition (2) had long average life and consistent life duration.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A seal case for a bearing seal, comprising:
   an inner case encircling a rotation axis of the bearing seal;
   an outer case encircling the rotation axis and including:
      a ring-shaped frame with an inner side facing the inner case; and
      a rubber gasket over-molded on the inner side of the ring-shaped frame, the rubber gasket forming ribs; and
   a plastic wafer clamped between the inner case and the outer case, and secured at least by the ribs of the rubber gasket.

2. The seal case of claim 1,
   the inner case including a first radial leg;
   the ring-shaped frame including a second radial leg;
   the plastic wafer including a third radial leg and a lip extending radially inwards from the third radial leg, the third radial leg being clamped between the first radial leg and a portion of the rubber gasket over-molded on the second radial leg.

3. The seal case of claim 1, the rubber gasket being further over-molded on an outer side of the ring-shaped frame opposite the inner side.

4. The seal case of claim 1, the rubber gasket including one or both of:
 a radial lip extending from the ring-shaped frame toward the rotation axis; and
 a axial lip extending away from an outer side of the ring-shaped frame opposite the inner side.

5. The seal case of claim 1, the rubber gasket further including, extending away from an outer side of the ring-shaped frame opposite the inner side, a radially outward-facing ribbed section for engaging with a hub.

6. The seal case of claim 1, the ribs comprising radial ribs that resist slippage of the plastic wafer.

7. The seal case of claim 1, the ribs comprising circumferential ribs for sealing a leak path between the rubber gasket and the plastic wafer.

8. The seal case of claim 1, the plastic wafer being formed from a material that attains a gel state when melted.

9. The seal case of claim 1, the plastic wafer including polytetrafluoroethylene.

10. A bearing seal, comprising:
 the seal case of claim 1, the ring-shaped frame having an outer side opposite the inner side, the plastic wafer including:
  a radial leg clamped between the inner case and the rubber gasket; and
  a lip connected to an innermost diameter of the radial leg; and
 a sleeve encircling the rotation axis and wrapping around (i) at least a portion of the outer side and (ii) a radially-innermost extreme of the seal case, the sleeve being rotatable about the rotation axis relative to the seal case, the sleeve including an inner-diameter leg that is radially inwards from the seal case and extends parallel to the rotation axis such that the inner-diameter leg engages with the lip.

11. The bearing seal of claim 10, the rubber gasket including a radial lip extending from the ring-shaped frame toward the inner-diameter leg of the sleeve.

12. The bearing seal of claim 10,
 the sleeve further including:
  an outer-diameter leg that is radially outwards from the plastic wafer and extends parallel to the rotation axis; and
  a middle section connecting between the inner-diameter leg and the outer-diameter leg, the middle section and the outer-diameter leg wrapping around the at least a portion of the outer side;
 the bearing seal further comprising a thrust bumper seated in the rubber gasket on the outer side of the outer case, the thrust bumper facing an edge of the outer-diameter leg of the sleeve.

13. The bearing seal of claim 12, the rubber gasket including one or both of:
 a radial lip extending from the ring-shaped frame toward the inner-diameter leg of the sleeve; and
 an axial lip extending from the ring-shaped frame toward the middle section of the sleeve.

14. A method for manufacturing a bearing seal, comprising:
 over-molding a rubber gasket onto a ring-shaped frame to form an outer case, the rubber gasket forming ribs;
 placing a plastic wafer between the rubber gasket and an inner case such that the plastic wafer contacts the ribs; and
 securing the inner case to the outer case to form a seal case;
 wherein the ribs include one or both of (i) radial ribs to resist slippage of the plastic wafer and (ii) circumferential ribs for forming a static seal between the rubber gasket and the plastic wafer.

15. The method of claim 14, wherein said over-molding further includes molding a radial lip that extends radially inwards from a radially innermost edge of the ring-shaped frame.

16. The method of claim 14, wherein said over-molding further includes molding an axial lip that extends away from an outer side of the ring-shaped frame opposite the plastic wafer.

17. The method of claim 14, wherein said over-molding further includes molding a receptacle for a thrust bumper on an outer side of the ring-shaped frame opposite the plastic wafer.

18. The method of claim 14, wherein said over-molding further includes molding a radially outward-facing ribbed section on a radially outward-facing portion of the ring-shaped frame.

19. The method of claim 14, wherein said placing and securing cooperate to clamp the plastic wafer directly between the rubber gasket and the inner case.

20. The method of claim 14, further comprising spin forming the ring-shaped frame and the inner case.

21. The method of claim 14, further comprising:
 disposing the seal case between a sleeve and a retainer ring, the sleeve wrapping around (i) an outer side of the outer case opposite the plastic wafer and (ii) a radially innermost extreme of the seal case closest to a rotation axis of the seal case, the retainer ring being on a side of the inner case opposite the plastic wafer; and
 securing the retainer ring to the sleeve.

22. The method of claim 21,
 further comprising seating, before said disposing, a thrust bumper in the rubber gasket on the outer side;
 wherein said disposing includes positioning the sleeve such that an edge of the sleeve faces the thrust bumper.

* * * * *